United States Patent [19]
Poulsen

[11] 3,778,161
[45] Dec. 11, 1973

[54] EXTENDED-RANGE SPECTROSCOPE FOR INTENSE RADIATION SOURCES

[75] Inventor: Peter D. Poulsen, San Diego, Calif.

[73] Assignee: General Dynamics Corporation, San Diego, Calif.

[22] Filed: Oct. 12, 1971

[21] Appl. No.: 188,270

[52] U.S. Cl.................. 356/51, 250/83 R, 356/74
[51] Int. Cl............................................... G01j 3/00
[58] Field of Search................ 356/74, 76–79, 356/83, 84, 98, 51; 250/83.3 H, 83.3 HP, 83.3 UV, 83 R

[56] References Cited
UNITED STATES PATENTS

| | | | |
|---|---|---|---|
| 2,444,560 | 7/1948 | Feldt et al............................ | 356/83 |
| 3,260,180 | 7/1966 | Teeple............................ | 356/79 UX |
| 3,363,525 | 1/1968 | Teeple............................ | 356/79 X |
| 3,379,830 | 4/1968 | Menke............................ | 250/83.3 H |
| 3,580,679 | 5/1971 | Perkin............................ | 356/76 |

FOREIGN PATENTS OR APPLICATIONS

| 15,493 | 8/1901 | Great Britain............................ | 356/98 |

OTHER PUBLICATIONS

Low: "Observing Plans for October's Eclipse – II" Sky and Telescope, Vol. 17, No. 9, July 1958, pages 450–453.

Harwit: "Spectrometric Imager", Applied Optics, Vol. 10, No. 6, June 1971, pages 1415–1421.

Primary Examiner—Ronald L. Wibert
Assistant Examiner—F. L. Evans
Attorney—John R. Duncan et al.

[57] ABSTRACT

An improved spectroscope for securing simultaneous data regarding both spatial and spectral information from intense sources of radiation. A dual-mode optical system is utilized wherein spatial information is directed to three adjacent screens for the near ultraviolet, visible, and near infrared, respectively, and spectral information is directed to an elongated spectra screen located directly below the three spatial screens. This dual-mode function is performed through the use of fluorescent material technology which replaces the more conventional and complex image tube and detector array technology, thereby resulting in a truly portable spectroscope which is light weight, compact, low cost, requires little maintenance, and has very low power requirements.

22 Claims, 4 Drawing Figures

EXTENDED-RANGE SPECTROSCOPE FOR INTENSE RADIATION SOURCES

BACKGROUND OF THE INVENTION

The invention relates to a spectroscope for analysis of intense sources of ultraviolet, visible, and infrared radiation, and more particularly to a system which provides for alignment of the spectroscope with the source by viewing the source on an imaging screen by means of a dual-mode optical system.

Electromagnetic radiation in the wavelength range of 3,800 to 7,800 angstrons (A) is generally considered as visible to the human eye. The ultraviolet range begins at the short wavelength limit of visibility which appears violet (4,000A) to the human eye and extends to the wavelengths of x-rays (less than 1,000A). The ultraviolet range is further subdivided into the near (4,000–3,000A), far (3,000–2,000), and extreme (below 2,000A) ultraviolet regions. The extreme ultraviolet range is sometimes called the "vacuum ultraviolet" because the absorption by air of these wavelengths requires an evacuated volume to transmit the radiation. At the long wavelength limit of visibility, which appears red (8,000A or 0.8 micron), begins the infrared range which extends to the wavelengths of microwave (greater than 1,000 microns). The near infrared range is generally considered to be from 0.8 to 2.5 microns.

Ultraviolet energy in the near region is sometimes called "black light" and is used to excite fluorescent pigments in dyes and inks to produce dramatic effects in decorations and advertising as well as practical utility in automotive and aircraft instruments and invisible identification such as laundry marks. Likewise, the invisible infrared radiation has many scientific, industrial, and military applications including chemical analysis and spectroscopy, industrial process controls, invisible signaling, burglar alarms, detection of military targets, and spacecraft guidance.

Detection of these invisible radiation sources must first be accomplished before a spectroscope can be properly aimed or aligned with the source for analysis or interrogation of the radiation energy. Detectors of ultraviolet radiation include phototubes, photovoltaic or photoconductive cells, and other radiometric devices. Infrared detectors include thermal detectors, which use a change in electrical resistance or other physical changes caused by a temperature increase of the detecting element when radiated with infrared energy, photovoltaic and photoconductive cells, and other radiometric devices. Whatever detectors are employed, they all essentially convert the radiant energy into an electrical signal which is amplified electronically and sent to some type of display which can be read by an operator. Displays include digital readouts, analogue dials, lights, or cathode ray tubes.

Once a radiation source is detected, the spectroscope is aimed at the source. This may be accomplished by aiming the spectroscope at the same ordinates, conventionally azimuth and elevation, as the detector, or the detecting device may be attached to and "boresighted" with the spectroscope so that both are simultaneously aiming at the light source.

It is usually desirable to have a spatial display for the operator along with the source detection displays. The simplest of display would be a sight ring. Another technique would utilize conventional optics in the form of a telescope. There are currently systems available which utilize a conventional T.V. camera and display for detecting the visual range of radiation and for the spatial display. Electronically coupled to the T.V. display are the ultraviolet and infrared detector circuits in such a way that any radiation source in these ranges are projected onto the T.V. display, appearing as a visible light, to give a spatial readout of the source location.

Such systems are cumbersome, requiring electrical power sources and having electronic components and circuitry which require periodic adjustment and maintenance, and do not have the degree of portability required for quick field usage. Additionally, there are the problems of parallax between the several detection systems, the spatial display, and the spectroscope, and the need for periodic boresighting and adjusting of these systems.

Thus, there is a need for an improved device for detecting and spatially orienting a radiation source for spectral analysis, wherein the device utilizes no electronic circuitry, and is sufficiently small and lightweight to be hand held by an operator.

SUMMARY OF THE INVENTION

It is, therefore, an object of this invention to provide an improved spectroscope overcoming the above noted problems.

A further object of this invention is to provide a spectroscope device which will simultaneously provide spatial information on ultraviolet, visible, and infrared wavelength regions and whenever the devide is aimed at a high intensity source to additionally provide a spectral display of the radiation source.

Another object of this invention is to detect and analyze intense radiation sources without the use of complex image tube and electronic detector devices.

Another object of this invention is to provide an extended range spectroscope for intense radiation sources which is sufficiently compact to permit hand-held operation.

Another object of this invention is to provide an extended range spectroscope which is self-contained within a single package that requires no outside source of electrical power.

Another object of this invention is to provide an extended range spectroscope which eliminates the problems of parallax and alignment between the visual detector and the spectral detector.

The above objects, and others, are accomplished by the present invention utilizing a new and novel dual-mode optical system, which collects the incoming radiation and directs the energy to a spatial display, and when the device is centered on the high intensity radiation source the energy is diverted to the spectral optic system while maintaining the surrounding spatial information on the spatial display.

BRIEF DESCRIPTION OF THE DRAWINGS

The advantages of the present invention reside in the construction and cooperation of elements as hereinafter described, reference being made to the accompanying drawings which show a preferred embodiment of the invention, and forming a part hereof, wherein.

DETAILED DESCRIPTION OF THE INVENTION

Figure 1:
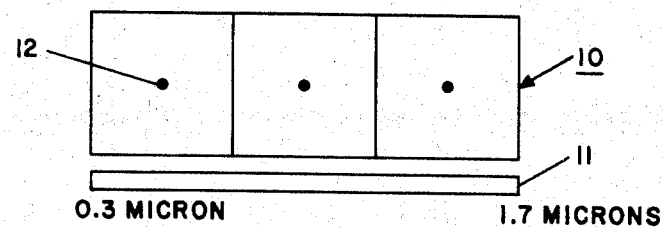
FIG. 1 is a view of the spectroscope screens as seen by the operator looking through the eyepiece.

Referring now to the drawings in detail, FIG. 1 is a view of the various screens as seen by the operator when looking through the eyepiece. The spatial screen assembly 10, comprises three screens each having the same field of view, and each having an opaque spot 12, located near their respective centers. Each screen provides spatial information for a different spectral region, the left screen showing ultraviolet, the center screen showing visible, and the right screen showing near-infrared, thereby yielding spatial display throughout the region of 0.3 to 1.7 microns. While the opaque spot 12 is illustrated as being located near the respective centers of the screens, it is not limited to this location and may be offset in any desired direction on the screens. The expected source of radiation is kept in the spatial screens by the operator, or the operator moves the hand-held spectroscope much like panning a camera until the source is observed. When a bright source is noted on any of the three screens, the spectroscope is moved to position the opaque spot over it. When so positioned, the source radiation will be diverted to the elongated spectral screen 11, which has an associated wavelength scale along the bottom edge. Bright spots or continua will appear at positions corresponding to the radiation wavelengths. The spatial location of the source of radiation can then be noted by the position of the opaque spot on the image screens, while the source spectroscopic data can be noted on the spectral screen 11.

Figure 2:
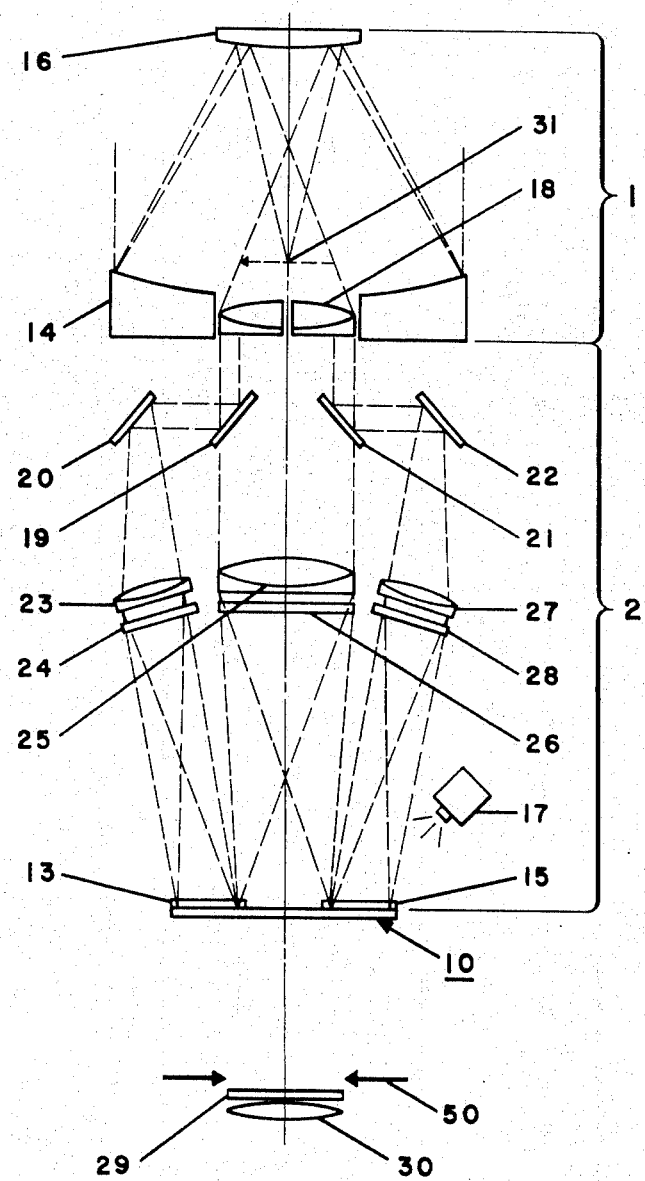
FIG. 2 is a plan-view schematic of the image optics of the spectroscope.

FIG. 2 is a plan-view schematic presentation of the image optics of the spectroscope, wherein the previously described spatial screen assembly 10, is viewed on edge near the bottom of the view. Spectral screen 11, is likewise on edge in conformity with screen assembly 10, and out of view below screen 10. The optical train can generally be divided into the controlling optics 1, and the imaging optics 2. Incoming light is collected by the primary objective mirror 14 which is a front-surface, converging mirror. It should be noted that for convenience radiations in the near ultraviolet, visible, and near infrared ranges will hereinafter be generally described as "light". The secondary objective mirror 16 is a front-surface diverging mirror. The collecting optics can be focused for targets at various distances by moving the secondary objective mirror 16 to change its distance from the primary objective mirror 14. This mirror combination focuses the incoming light to a plane immediately in front of the secondary objective lens 18, as shown in FIG. 2 by a dotted line through point 31. The utilization of mirrors 14 and 16 prevents chromatic aberration and ultraviolet absorption that would exist if lenses were utilized for the collecting optics, and additionally mirrors are preferred because they are light weight and provide wide aperture.

Two 45° front surface mirrors 19 and 21 are disposed into the light path passing through the secondary objective lens 18. Another set of front surface mirrors 20 and 22 are so located to relay light to their respective image-forming lenses 23 and 27. Light passing through the secondary objective lens is also relayed to the larger image-forming lens 25. Thus it can be seen that the incoming light collected by the primary objective mirror 14 is divided and relayed to the three image-forming lenses 23, 25 and 27, the degree of division of the collected light between the three paths being a function of the depths into the light path which the 45-degree front surface mirrors 19 and 21 are disposed.

Immediately behind image-forming lens 23, is an ultraviolet pass-filter 24, which limits light transmission therethrough to the ultraviolet region. In a like manner, infrared pass-filter 28 is located immediately behind image-forming lens 27 and limits light transmission to the near-infrared region. Visible pass-filter 26 is located behind lens 25, and in a like manner limits the light transmission to the visible range, thereby giving a spatial presentation of better quality than that observable by the unaided eye, much like a pair of optically correct sunglasses improves observations.

As previously described, spatial screen assembly 10 comprises three separate screens, which are viewable through the eyepiece 30. The center screen may be ground (frosted) glass located at the focal plane to display the visible region image. Sensing can be accomplished simply with the human eye, and use of a ground glass screen is usually the preferred embodiment, however in some instances where improved sensitivity and resolution are required in visible observation, the ground glass screen is eliminated, allowing the focused image to be relayed directly by the eyepiece 30. This eliminates light loss due to scattering away from the eyepiece, and does away with resolution limitations imposed by the ground glass. In this case however, the effective aperture of the human eye, even when looking through various configured eyepieces, is such that a hole in the field of vision is apparent due to the center hole in the primary objective mirror 14. This requires off-axis operation to overcome the problem, and is therefore not considered to be the preferred embodiment, although it should be appreciated that for special circumstances it may be desirable and feasible to so arrange the optics. It should also be appreciated that the three spatial screens of assembly 10 may be of equal size or of various sizes as for example in FIG. 2 the center visible screen and its associated optics are illustrated as larger than the left and right screens. In other applications it may only be necessary to have one or two spatial screens if the range of wavelengths of interest is sufficiently small. As an example it may only be necessary to have visual range screen, or a visual and an infrared set of screens for viewing molten metal in a foundary or for viewing incendiary materials and the like.

As previously described the left spatial screen of assembly 10 presents the near ultraviolet spatial display, and comprises a transparent substrate, coated with a phosphor material 13. Many suitable materials show visible fluorescence with ultraviolet irradiation. Typical materials include the radium base compounds and organic phosphors. Radium base compounds are preferred for the particular optical components herein described, ultraviolet sources down to 0.3 micron wavelengths being all that are required in the preferred embodiment since this lower wavelength allows observation of sources such as the nitrogen ion laser at 0.3371 micron, which is a typical lower wavelength source. It should of course be appreciated that if necessary the optics could be so arranged to permit farther ultraviolet ranges to be observable. Materials are preferred that will fluoresce at radiations up to wavelengths of at least 0.4 microns, where human vision becomes sensitive. Any material with sensitivity tending beyond the 0.4 microns is also acceptable, since a simple cutoff filter will provide the necessary isolation. If it is desirable to resolve temporal changes in the source radiation, the material must additionally have very little fluorescent persistence, while retaining good quantum efficiency and resolution.

The right hand spatial screen of assembly 10 presents the near infrared spatial display, and like the ultraviolet screen it comprises a transparent substrate coated with a phosphor material 15. Suitable materials for emitting light when irradiated in the near infrared region include rare-earth doped strontium sulfide, cholesteric liquid crystals, cobalt chloride, and lanthanum fluoride. Of these materials strontium sulfides doped with rare-earths such as europium and samarium are preferred because of their sensitivity over a wide wavelength band.

Near infrared sensing is more difficult to accomplish than sensing ultraviolet. This is because ultraviolet photons have excess energy when compared to the energy of the visible phosphor photons which are dislodged. In contrast, to get a visible region yield from infrared energy requires additional energy from an outside source. This is usually accomplished by either amplifying an electronic signal from vidicons and discrete detectors, or by accelerating electrons between the target and the phosphor surface of an image convertor. The present invention substitutes fluorescent material for complex image convertors and detector arrays, by means of a simple technique of supplementing the infrared energy by activating the fluorescent material to excited energy levels with blue region light in the 0.4 to 0.55 micron wavelength region. This excited energy level of the phosphor coating causes visible photons to be dislodged and the phosphor thereby to emit visible light immediately upon receiving any near infrared light. The visible emission peaks in the orange at approximately 0.64 micron wavelength. The emission persists for the duration of irradiation if periodic reactivation with blue light is supplied, and when the infrared irradiation is removed the image disappears in nanoseconds, facilitating counting of very fast pulse repetition rates of incoming laser light sources.

The blue light activation of the infrared phosphor is accomplished by using a portable strobe light 17 of the type conventionally used for flash photography, wherein a spectral filter is placed over the strobe light to limit the transmission to the blue region. This blue light is concentrated onto the phosphor screens when triggered by the operator. To protect the operator's eye during the brief, but very intense, flash from the strobe light, an eyepiece blocking shutter 50 is utilized. The blocking shutter 50 is actuated when the operator triggers the strobe light.

The eyepiece 30 accommodates the full field of screen assembly 10, and spectral screen 11, with operator comfort. Included as a safety precaution in the eyepiece 30 is a strong spectral filter 29 that passes only the visible energy emitted from the screens so that any ultraviolet or infrared radiation that might pass through their respective phosphor screens is absorbed before reaching the operator's eye.

Figure 3:
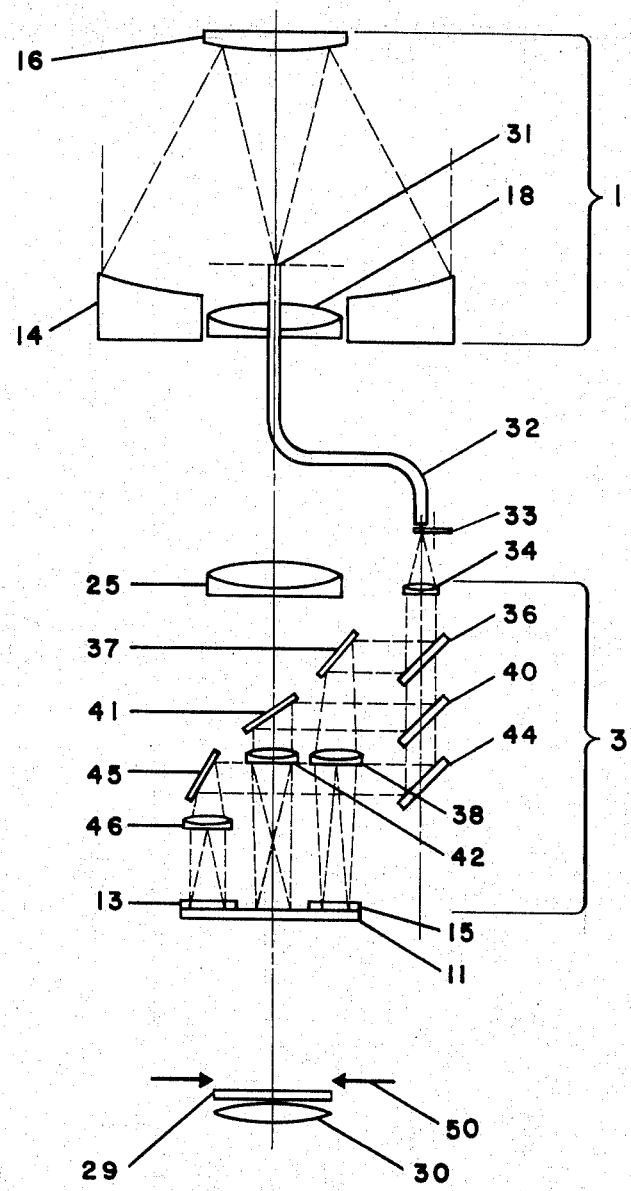
FIG. 3 is a plan-view schematic of the spectral optics of the spectroscope.
Figure 4:
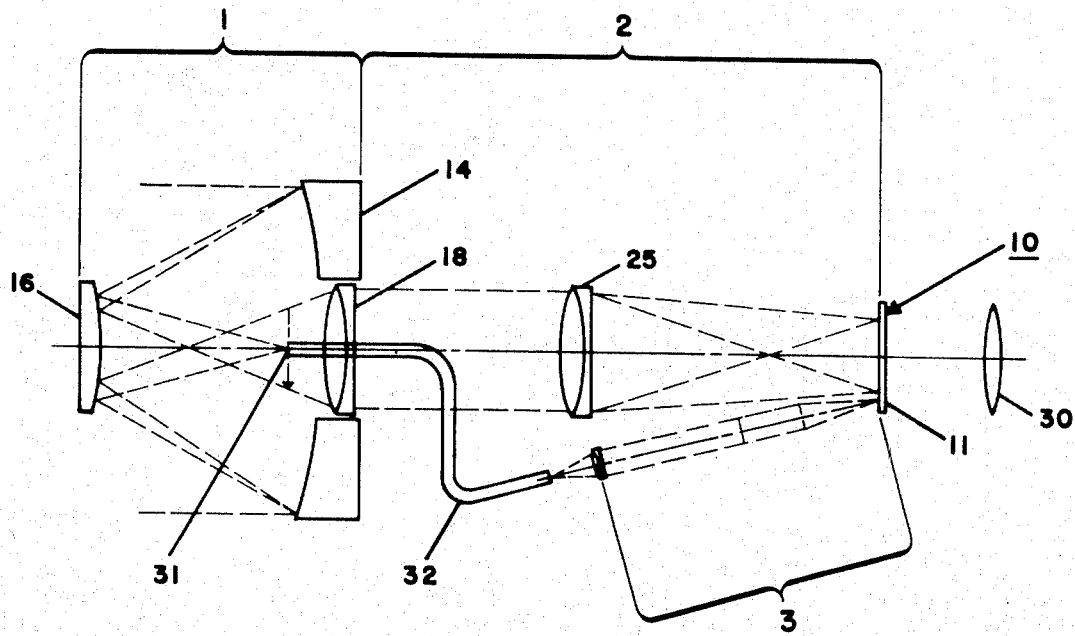
FIG. 4 is a side-view schematic of the combined image and spectral optics of the spectroscope.

Referring now to FIG. 3 it will be observed that collecting optics 1 comprises the primary objective mirror 14, the secondary mirror 16, and the secondary objective lens 18 as previously shown in FIG. 2. FIG. 3 is an optical schematic, illustrating the spectral optics 3 in detail. These spectral optics lie in an oblique plane located below the imaging optics 2, as shown in FIG. 4. A light pipe 32 is disposed within the spectroscope, passing through a hole in the secondary objective lens 18, to probe a small portion of the image at point 31, in the focal plane formed by the collecting optics. Light falling on the end of the light pipe is routed to a location out of the imaging optics path in a manner which prevents interfering with the image formation at screen assembly 10. Any suitable optical relay train may be used in the light pipe. Of these a bundle of fiber optics is preferred because of low cost, light weight, and they require no critical adjustment of components to accommodate curved transmissions. It should be noted that the light falling on the light pipe 32 at point 31 and thereafter routed out of the imaging optics produces the opaque spot 12 in the imaging optics that is displayed on the three screens of the spatial screen assembly 10 and as previously described the opaque spot 12 may be disposed at any desired location on the screens as a function of the location of point 31 in the focal plane. It should be further noted that only when the opaque spot 12 on one of the three screens is placed over the light source will the light from the source be directed to the light pipe 32 and displayed on the spectral screen 11.

Light emerging from the output end of the light pipe 32 is collimated by lens 34, FIG. 3, and directed into a series of mirrors 36, 40 and 44, located at 45° to the collimation axis. The first mirror 36 is a dichroic beam splitter that reflects light below 0.4 microns and transmits light above that wavelength. The second mirror 40 is a dichroic beam splitter that reflects visible light and transmits the infrared wavelengths. The third mirror 44 is a front-surface mirror that reflects the remaining infrared light. It should be appreciated that the functions of mirrors 36 and 40 could be interchanged if desired, wherein the infrared wavelength would be the first reflected and all light below that wavelength would be transmitted, and thereafter the last light reflected would be the ultraviolet wavelength. Further, it should be clear that if the range of wavelengths of interest is sufficiently small then only one mirror and set of associated optics hereinafter described would be required. Aligned optically with each of the three 45° mirrors 36, 40 and 44 are three reflective diffraction gratings 37, 41 and 45 respectively, each having the line spacing and appropriate angular orientation to disperse light in an appropriate manner to their respective spectrum forming lens 38, 42, and 46 and thereby focus across the wavelength screen 11. Thus it can be seen that a beam of light emerging from the output end of light pipe 32 is subjected to dispersion, and then brought to focus so that the component waves are arranged in the order of their wave length in a series of images, or a single image on the spectral screen 11. As was previously described these images may appear as bright spots or continua, depending on the energy source, at the positions along the wavelength scale of screen 11 corresponding to the radiation wavelength. In those instances where the spot is too large or where continua is so broad that the desired resolution is not obtained, the light beam is stopped-down by aperture wheel 33, which contains a plurality of various sized apertures that may be selectively placed between the output end of light pipe 32 and collimating lens 34.

Because of the dispersion of light previously described, the net irradiance on the phosphors for any broadband source is considerably less than that obtained with the imaging optics 2, of FIG. 2, wherein all wavelengths are effectively focused to the same spot. This is the reason for utilizing dichroic mirrors for the spectral optics, so that as much light as possible is conserved, and why in the imaging optics, where effective irradiance is higher, the light is simply divided approximately in thirds with front-surface mirrors and thereafter filtered with a resultant greater loss of efficiency. The screen 11 is coated with the same or similar phosphors utilized for the spatial screens. The length of the screen 11 from 0.3 microns to 0.4 microns is coated with one of the ultraviolet sensitive phosphors 13, from 0.4 to 0.8 microns comprises ground glass, and from 0.8 to 1.7 microns is coated with one of the infrared sensitive phosphors 15.

FIG. 4 is a schematic presentation of the combined optical systems of the spectroscope when viewed in a side elevation. Collecting optics 1 transmit incoming light to secondary objective lens 18 where it enters the imaging optics 2 and simultaneously transmits light to the front end 31 of light pipe 32 where it enters the spectral optics 3 as hereinbefore described.

The construction and operation of the spectroscope will be apparent from the foregoing description and it can be clearly seen that the present invention is uniquely suited for obtaining image and spectrographic data on intense sources of light ranging in wavelength from approximately 0.3 to 1.7 microns. This range is for illustration purposes, and it should be appreciated that other ranges may be utilized where desirable. The range of the herein described preferred embodiment of the device is approximately centered about wavelengths associated with well developed lasers, including neodymium at 1.06 microns, ytterbium at 1.02 microns, and helium-neon at 1.15 microns, and is extended low enough to include the nitrogen ion laser at 0.3371 micron. The device is sufficiently small to be hand held, weighs less than 10 pounds, and requires only sufficient battery power for a camera type strobe light to periodically activate the infrared phosphors. Additional features may be added to the device if desired, such as source pulse-counting and camera recordings of the displays. As an example, part of the fiber optics bundle may be routed to a small photomultiplier tube with a mixture of phosphor screens disposed at its window, so that the pulses can be counted and rates determined with associated circuitry. It will be apparent that the embodiment illustrated is for example only, and that many other arrangements may be devised to tailor the spectroscope to desired requirements, and that the foregoing description is not to be taken as a limitation, the spirit and scope of the invention being limited only by the claims.

I claim:

1. A spectroscope for simultaneously providing spatial and spectral displays of a remote light source comprising:
    a plurality of viewing screens;
    a collecting optical system for receiving light from a remote source and focusing the light to a focal plane;
    a spatial imaging optical system for receiving a first portion of light from said focal plane for filtering and focusing said first portion of light into a spatial image on at least one of said viewing screens; and
    a spectral optical system for receiving a second portion of light from said focal plane for dispersing and subsequently focusing said second portion of light so that component waves are arranged in the order of their wavelengths in a series of spectral images on at least one of said viewing screens.

2. The spectroscope of claim 1 wherein the spatial imaging optical system comprises:
    a secondary objective lens for collecting said first portion of light from said focal plane;
    an image forming lens in optical alignment with said secondary objective lens for focusing said first portion of light onto one of said viewing screens; and
    a pass-filter adjacent to said image forming lens.

3. The spectroscope of claim 2 wherein said pass-filter includes filtering means for transmitting only infrared light.

4. The spectroscope of claim 2 wherein said pass-filter includes filtering means for transmitting only ultraviolet light.

5. The spectroscope of claim 2 wherein said pass-filter includes filtering means for transmitting only visible light.

6. The spectroscope of claim 5 further comprising:
    a pair of front-surface mirrors disposed between said secondary objective lens and said image forming lens for diverting a first portion of the image beam transmitted by said secondary objective lens away from said image forming lens;
    a second image forming lens in optical alignment with said pair of front-surface mirrors for receiving reflected light therefrom and focusing said light on one of said viewing screens; and
    a second pass-filter adjacent to said second image forming lens.

7. The spectroscope of claim 6 wherein said second pass-filter includes filtering means for transmitting only infrared light.

8. The spectroscope of claim 1 wherein the spectral optical system comprises:
    a light pipe for routing said second portion of light from said focal plane away from said focal plane;
    a collimating lens located at the exit end of said light pipe;
    a mirror disposed along the axis of said collimating lens;
    a reflective diffracting grating located in optical alignment to receive reflected light from said mirror and reflect dispersed light therefrom; and
    a spectrum forming lens located in optical alignment with said reflective diffracting grating to receive the dispersed light therefrom and focus said spectral images on at least one of said viewing screens.

9. The spectroscope of claim 8 wherein said mirror is a dichroic beam splitter for reflecting only ultraviolet light.

10. The spectroscope of claim 8 wherein said mirror is a dichroic beam splitter for reflecting only visible light.

11. The spectroscope of claim 8 wherein said mirror is a dichroic beam splitter for reflecting only infrared light.

12. The spectroscope of claim 8 wherein said mirror is a first dichroic beam splitter, and further comprising:
a second dichroic beam splitter disposed along the axis of said collimating lens for reflecting visible light and transmitting other wavelengths;
a second reflective diffracting grating disposed in optical alignment to receive the visible light reflected from said second dichroic beam splitter and reflect dispersed light therefrom; and
a second spectrum forming lens located in optical alignment with said second reflective diffracting grating to receive the dispersed light therefrom and focus said spectral images on at least one of said viewing screens.

13. The spectroscope of claim 12 wherein said first dichroic beam splitter is constructed for reflecting infrared light and transmitting lower wavelengths.

14. The spectroscope of claim 6 wherein said second pass-filter includes filtering means for transmitting only ultraviolet light.

15. The spectroscope of claim 12 wherein said first dichroic beam splitter is constructed for reflecting ultraviolet light and transmitting higher wavelengths.

16. The spectroscope of claim 14 further comprising:
a second pair of front-surface mirrors disposed between said secondary objective lens and said image forming lens for diverting a second portion of the image beam transmitted by said secondary objective lens away from said image forming lens;
a third image forming lens in optical alignment with said second pair of front-surface mirrors for receiving reflected light therefrom and focusing said light on one of said viewing screens; and
a third pass-filter adjacent to said third image forming lens for transmitting only infrared light.

17. The spectroscope of claim 15 further comprising:
a third dichroic beam splitter disposed along the axis of said collimating lens for reflecting infrared light and transmitting lower wavelengths;
a third reflective diffracting grating disposed in optical alignment to receive the infrared light reflected from said third dichroic beam splitter and reflect dispersed light therefrom; and
a third spectrum forming lens located in optical alignment with said third reflective diffracting grating to receive the dispersed light therefrom.

18. A spectroscope for simultaneously providing spatial and spectral displays of a light source comprising:
a collecting optical system for receiving light from a remote source and focusing the light to a focal plane;
a spatial imaging optical system for receiving a first portion of light from said focal plane comprising;
an objective lens located adjacent to said focal plane,
means for dividing light transmitted through said objective lens into three light beams,
a spatial screen having a first area sensitive to ultraviolet light, a second area sensitive to visible light, and a third area sensitive to infrared light,
an ultraviolet pass-filter disposed in the first light beam for passing ultraviolet light to said first screen area,
a visible pass-filter disposed in the second light beam for passing visible light to said second screen area,
an infrared pass-filter disposed in the third light beam for passing infrared light to said third screen area,
a spectral optical system for receiving a second portion of light from said focal plane comprising;
a light pipe for routing said second portion of light away from said focal plane,
light dispersion means for receiving light from the exit end of said light pipe and dispersing light so that the component waves are arranged in the order of their wave lengths, and
a spectral screen spaced from said light dispersion means for receiving and displaying the dispersed light transmitted thereon.

19. The spectroscope of claim 18 wherein the collecting optical system comprises:
a primary objective mirror for collecting incoming light and reflecting the light in a converging path, said primary objective mirror having a hole located therein;
a secondary objective mirror located in front of said primary mirror for reflecting light from said primary mirror back through said hole in said primary mirror; and
wherein said objective lens in the spatial imaging optical system is located within said hole of said primary objective mirror.

20. The spectroscope of claim 16 wherein said light dispersion means in the spectral optical system comprises:
a collimating lens;
a plurality of dichroic beam splitters disposed along the collimation axis of said collimating lens;
a plurality of reflective diffraction gratings disposed in optical alignment with said dichroic beam splitters; and
a plurality of spectrum forming lenses located in optical alignment with said gratings to focus light therefrom.

21. The spectroscope of claim 18, in the spatial imaging optical system, wherein said means for dividing light transmitted through said objective lens into three light beams comprises:
a first mirror located in and intercepting a portion of the optical light path from said objective lens;
a second mirror located in and intercepting a portion of the optical light path from said objective lens;
a first image forming lens located in and receiving a portion of the optical light path from said objective lens;
a third mirror located in optical alignment with said first mirror for receiving and reflecting light therefrom;
a fourth mirror located in optical alignment with said second mirror for receiving and reflecting light therefrom;
a second image forming lens located in optical alignment with said third mirror; and
a third image forming lens located in optical alignment with said fourth mirror.

22. A spectroscope for simultaneously providing spatial and spectral display of a light source comprising:
a collecting optical system for receiving light from a remote source and focusing the light to a focal plane;
a spatial imaging optical system comprising;

an objective lens located adjacent to said focal plane, a first image forming lens spaced from and in optical alignment with said objective lens, a visible range pass-filter located adjacent to said image forming lens for filtering light transmitted from said objective lens through said first image-forming lens, a screen spaced from said first image forming lens for receiving the visible image, means for relaying a portion of light passing through said objective lens away from said first image forming lens, a second image forming lens located in optical alignment with said relaying means;

an ultraviolet range pass-filter located adjacent to said second image forming lens for filtering the light transmitted through said second image forming lens, an ultraviolet sensitive screen spaced from said second image forming lens for displaying the ultraviolet image transmitted thereto, a third image forming lens located in optical alignment with said relaying means;

an infrared range pass-filter located adjacent to said third image forming lens for filtering the light transmitted through said third image forming lens, an infrared sensitive screen spaced from said third image forming lens for displaying the infrared image transmitted thereto, a spectral optical system comprising;

a light pipe having one end located in said focal plane for directing light falling thereon to a location outside the light path passing through said objective lens in the spatial imaging optical system, a collimating lens located at the output end of said light pipe, a plurality of beam splitters for dividing light passing through said collimating lens into beams of ultraviolet, visual, and infrared light, a plurality of reflective diffraction gratings in optical alignment with said beam splitters for dispersing said light beams over a spectral focal plane, and a spectral screen spaced from said gratings and lying within said spectral focal plane for displaying the dispersed light transmitted thereto.

* * * * *